United States Patent [19]

Tsuzuki

[11] 4,424,566

[45] Jan. 3, 1984

[54] DATA PROCESSING APPARATUS WITH VOICE OUTPUT

[75] Inventor: Hanzo Tsuzuki, Fussa, Japan

[73] Assignee: Casio Computer Co., Ltd., Tokyo, Japan

[21] Appl. No.: 258,948

[22] Filed: Apr. 30, 1981

[30] Foreign Application Priority Data

May 8, 1980 [JP] Japan .................................. 55-61139

[51] Int. Cl.³ .......................... G06F 3/16; G10L 1/08
[52] U.S. Cl. ..................................... 364/405; 364/710
[58] Field of Search ............... 364/710, 404, 405, 900; 179/1 SM, 1 SA

[56] References Cited

U.S. PATENT DOCUMENTS 4,185,169  1/1980  Tanimoto et al. .............. 364/710 X
4,282,404  8/1981  Tanimoto et al. .............. 364/710 X
4,348,551  9/1982  Nakatani et al. ................. 179/1 SM Primary Examiner—David H. Malzahn Attorney, Agent, or Firm—Frishauf, Holtz, Goodman and Woodward

[57] ABSTRACT

A voice data output apparatus judges whether amount of money data inputted is repeat registration data or not and, when it is repeat registration data, does not output a voice of the amount data. A CPU is connected to an input circuit, a print circuit, a display circuit, a RAM and the voice output circuit, through chip designating signal lines, an R/W signal line, an address bus line and a data bus line. The CPU delivers chip designating signals to the respective circuits to select the circuit to be used. The display circuit and the voice output circuit are selected by the same chip designating signal. When the repeat registration data is inputted with the input circuit, given code is stored in a digit representing the repeat registration in a register X of the CPU. When the data in the register X is transferred to the voice output circuit, the output circuit judges the code and does not produce the voice of the amount data. However, the amount data is displayed by the display circuit which has been simultaneously selected by the CPU.

5 Claims, 8 Drawing Figures

DATA PROCESSING APPARATUS WITH VOICE OUTPUT

The present invention relates to a voice output apparatus which converts numerical data into voice data and outputs the voice data in the form of human language. More particularly, the invention relates to a voice data output apparatus in which when the same numerical data are continuously displayed or printed by at least a display circuit or a print circuit, the voice of the same data is not repeated and a wait time in inputting the numerical data at an input section shortened.

There have been used electronic cash registers to audibly pronounce numerical data, e.g. amount data, in human language. This type of the electronic cash register displays amount data for an article of commodities and at the same time audibly pronounces numerical data every time the commodities articles is entered. Therefore, when the same article is repeatedly entered, the same amount data are voiced repeatedly according to the number of repetitions. Actually, however, in such a repeat registration, there is no need for repeating the second succeeding data if it is checked by the display and voice that the first amount data is correctly inputted. Nevertheless, the prior cash register voices the same amount data the same number of times as the number of repeated entries as mentioned above. This possibly makes it difficult to hear the voice of the amount data and frequently makes the operator uncomfortable. Further, the outputting of the voice takes a long time, so that the repeat registration of the data needs much of superfluous time for the voice outputting. Therefore, in such a case, the operator must wait for a long time until entering the amount data of another article at the input section of the electronic cash register.

Accordingly, the object of the present invention is to provide a voice data output apparatus with a reduced wait time in inputting numerical data at an input section.

To achieve the above object of the present invention, there is provided a voice data output apparatus comprising input means at least with an entry key for keying in numerical data and a repeat operation key, which produces an input signal resulting from these key operations; control means connected to said input means which performs a given operation in accordance with the input signal from said input means and produces data and control signals; visual data output means connected to said control means for producing visual data corresponding to said data in accordance with said data and said control signals outputted from said control means; and voice output means connected to said control means which produces a voice corresponding to said data based on said data and said control signals delivered from said control means and, when said data is subjected to a repeat operation, does not output a voice corresponding to said numerical data.

As described above the voice data output apparatus is constructed such that the same numerical data is not audibly pronounced if the numerical data is judged to be the data of the repeat operation when the numerical data inputted by the input means is converted into the voice data for its outputting. With this arrangement, in the repeat operation mode, the numerical data may be voiced at the minimum, thereby to eliminate the repeat of audibly pronouncing the same numerical data and thus to make it easy to hear the voice of the numerical data. The sounding of only the first numerical data saves the time taken for the repeat sounding, thereby to reduce the wait time taken for keying in the next numerical data from an entry key. Particularly, in the case of the repeat of the same numerical data of many digits, the wait time is remarkably reduced.

By way of example and to make the description clearer, reference is made to the accompanying drawings, in which.

Figure 1:
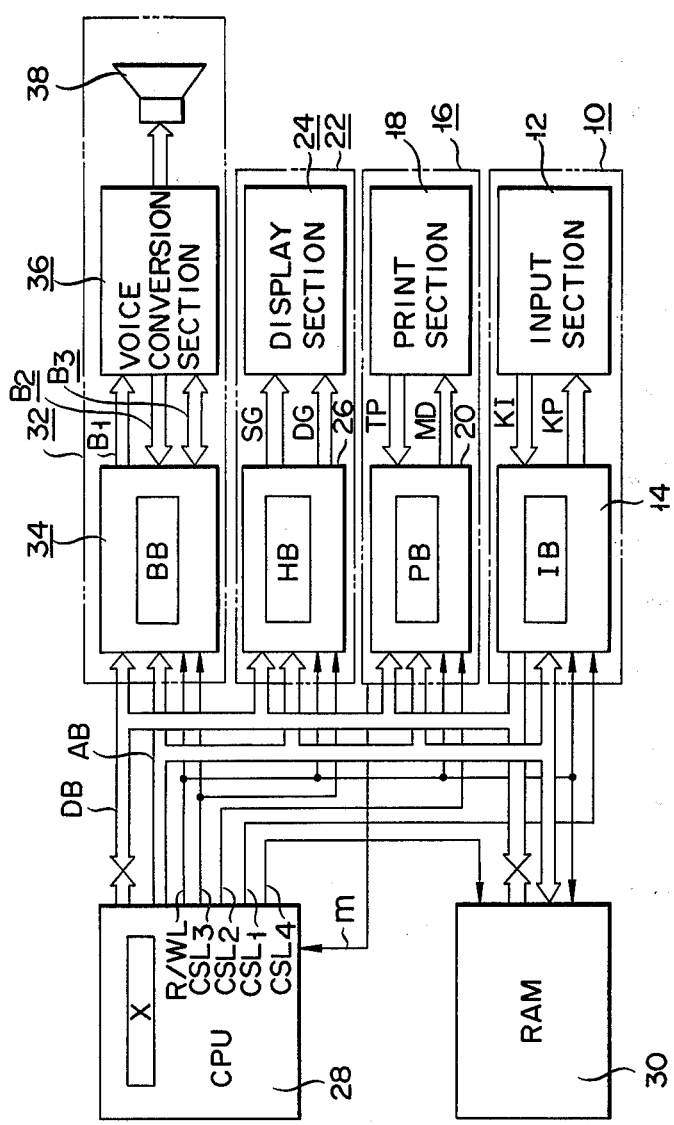
FIG. 1 is a block diagram of an embodiment in which a voice data output apparatus according to the present invention is applied to an electronic cash register.

Referring to FIG. 1, an input circuit 10 is comprised of an input section 12 and an input control section 14 connected to the input section 12.

The input section 12 has a voice selection switch for presetting the kind of voices to be outputted and mode switches for designating "register (REG)", "return (RET)", "set (SET)", "inspection (X)", and "exactness in calculation (Z)", as well as keys for designating amount of money (numeric value), department, subtotal and the like. When only a department key is operated after commodity registration data is inputted, a repeat registration is made. A timing signal KP for sampling is applied from the input control section 14 to the input section 12. When one of the keys is operated, the data keyed in is sampled by the timing signal KP. The signal sampled is transferred as a key-in signal KI to the input control section 14 and stored in an input buffer IB of the input control section 14.

A print circuit 16 is comprised of a print section 18 and a print control section 20 coupled with the print section 18.

The print section 18 with a print drum (not shown) applies a print position signal TP, to the print control section 20. The print control section 20 with a print buffer PB transmits a print drive signal MD, which is produced based on the data in the print buffer PB and the print position signal TP to the print section 18. As a result, amount data, for example, is printed on a journal sheet or receipt sheet by means of the print drum. The print control section 20 produces a "now printing signal" from the time when the print data is applied to the print buffer PB till the printing of the print data is completed.

A display circuit 22 is comprised of a display section 24 and a display control section 26 coupled with the display section 24.

The display control section 26 with a display buffer HB provides a digit signal DG and a segment signal SG obtained by decoding the data stored in the display buffer HB. The display section 24 displays amount data in accordance with both the signals.

The input, print and display control sections 14, 20 and 26 are connected through an address bus line AB, a data bus line DB and a read/write signal line R/W L to a CPU 28 and a RAM 30. The input control section 14 is connected through a chip designating signal line CSL1 to the CPU 28. A chip designating signal CS1 is transmitted through the line CSL1. The print control section 20 is connected through a line m and a chip designating signal line CSL2 to the CPU 28. A chip designating signal CS2 is transmitted through the line CSL2. The "now printing signal" to prohibit the transfer of the next data is transmitted through the line m. The display control section 26 is connected to the CPU 28 via a chip designating signal line CSL3 through which a chip designating signal CS3 is transmitted.

A RAM 30 is connected to the CPU 28, through a data bus line DB, an address bus line AB, a chip designating signal line CSL4 and the read/write signal line R/W L. The RAM 30 stores the sale data inputted through the input section 12 in the form of classifying into department data, transaction data, and the like.

The CPU 28 with a register X having 12 digits each including four bits transmits the chip designating signals CS1, CS2, CS3 and CS4 to the control sections 14, 20 and 26 and the RAM 30, through the chip designating signal lines CSL1 to CSL4. The CPU 28 transmits the R/W signal commonly for the control sections 14, 20 and 26 and the RAM 30, through the R/W signal line to make a data transfer between the CPU 28 and these control sections and between the CPU 28 and the RAM 30. The CPU 28 stops the transfer of the next data so long as the "now printing signal" is transmitted from the print control section 20 through the line m.

A voice output circuit 32 is removably coupled with the address bus line AB, the data bus line DB, the chip designating signal line CSL3, and the read/write signal line R/W L. The voice output circuit 32 is comprised of a voice control section 34, a voice conversion section 36 connected to the voice control section 34, and a speaker 38 connected to the conversion section 36. The voice control section 34 having a voice buffer BB writes the data inputted through the data bus line DB into the voice buffer BB. The voice control section 34 is connected to the voice conversion section 36, through the bus lines B1, B2 and B3 through which the data transfer is performed. The voice conversion section 36 converts the data transferred from the voice control section 34 to voice data and applies the voice data to the speaker 38.

The speaker 38 audibly pronounces the voice data transmitted from the voice conversion section 36.

Figure 2:
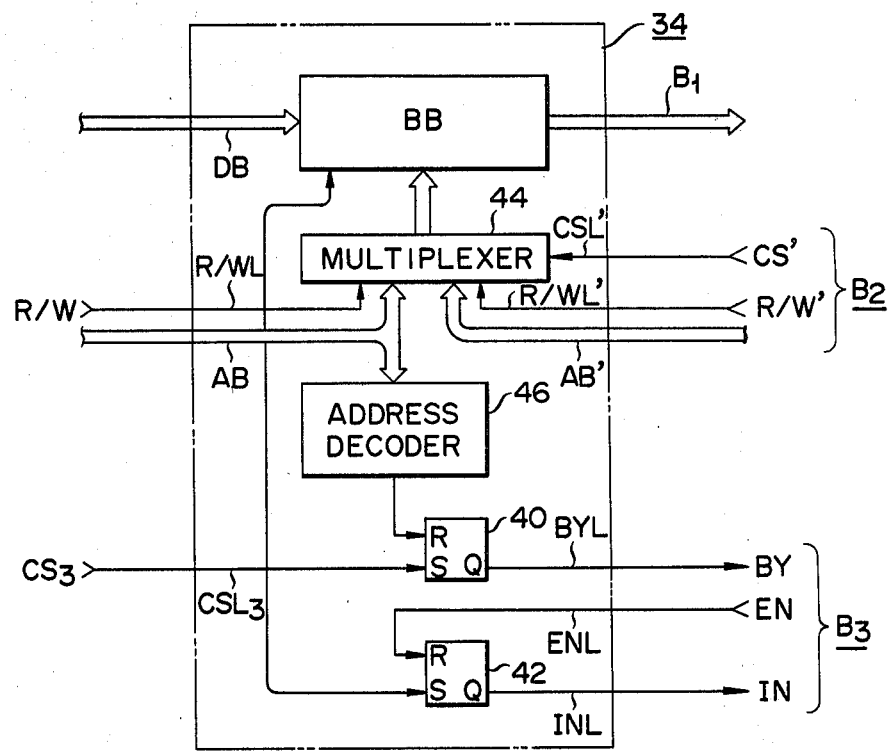
FIG. 2 is a block schematic diagram of a configuration of the voice control section shown in FIG. 1.

FIG. 2 is a block schematic diagram of the construction of the voice control section 34.

Flip-flops 40 and 42 are connected at the set input terminals S to the chip designating signal line CSL3 through which the chip designating signal CS3 is transferred. The set output terminal Q of the flip-flop 40 is connected to a "now writing" signal line BYL through which a "now writing" signal BY is outputted. The set output terminal Q of the flip-flop 42 is connected to an input signal line INL through which an input signal IN is outputted. The reset terminal R of the flip-flop 42 is connected to an end signal line ENL and is reset by an end signal EN applied through the signal line ENL to stop the outputting of the input signal IN.

The voice buffer BB has a memory capacity of 12 digits each including four bits. The voice buffer BB is connected to a multiplexer 44, the data bus line DB, the chip designating signal line CSL3, and the bus line B1. The data transferred through the data bus line DB is loaded into the voice buffer BB, in accordance with address data and the R/W signal delivered from the multiplexer 44. The voice buffer BB produces the data loaded into the buffer BB in accordance with the address data on an address line AB' and the R/W' signal, which are both delivered to the multiplexer 44.

The multiplexer 44 is connected to the signal line R/W L, the address bus line AB, a chip designating signal line CSL', a read/write signal line R/W L', and an address bus line AB'. The multiplexer 44 receives a chip designating signal CS' through the chip designating signal line CSL' to be switched at its input state. In accordance with the switched input state, the multiplexer 44 applies to the voice buffer BB the R/W signal delivered through the signal line R/W L, and the address data delivered via the address bus line AB. Alternatively, it applies to the voice buffer BB the R/W' signal applied through the signal line R/W L' and the address data delivered through the address bus line AB'.

An address decoder 46 is connected at the input terminal to the address bus line AB and at the output to a reset input terminal R of the flip-flop 40. The address data applied through the address bus line AB is applied to the address decoder 46. When address data representing the 12th digit of the register X in the CPU 28 is detected, the address decoder 46 outputs a reset signal to the reset input terminal R of the flip-flop 40 to stop the output of the "now writing" signal BY.

The chip designating signal line CSL', the signal line R/W L' and the address bus line AB' make up the bus line B2. The now writing signal line BYL, the end signal line ENL and the input signal line INT jointly make up the bus line B3.

Figure 3:
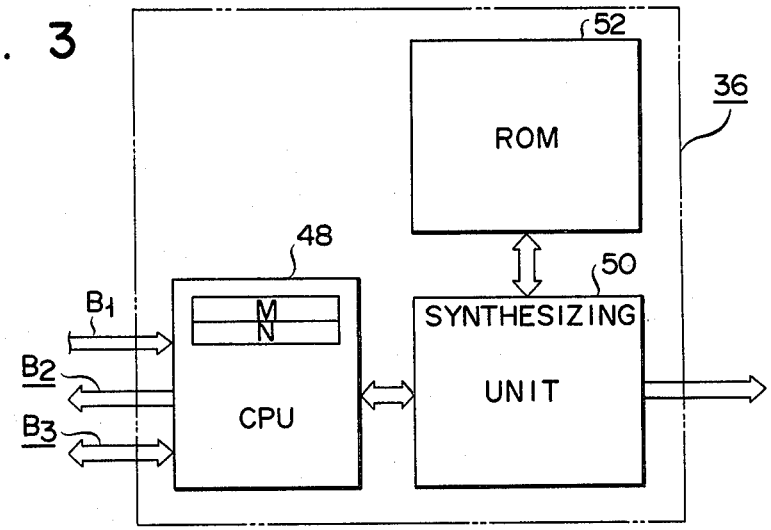
FIG. 3 is a block schematic diagram of a configuration of the voice conversion section shown in FIG. 1.

FIG. 3 is a block schematic diagram of an arrangement of the voice conversion section 36. The section 36 is comprised of a CPU 48, a synthesizing unit 50 connected to the CPU 48, and a ROM 52 connected to the synthesizing unit 50.

The CPU 48, connected to the voice control section 34 through the bus lines B1 to B3, makes a data transfer to and from the voice control section 34, through the bus lines B1 to B3. The CPU 48 also transfers the data to and from the synthesizing unit 50. The CPU 48 has registers M and N which have a memory capacity of 12 digits each including 4 bits. The individual digits in the register M and the register N are designated by M0 to M11, and N0 to N11, respectively. The data read out from the voice buffer BB is loaded into the register M. The data representing the number of times of the repeat registration is loaded into the digits of N8 and N9 of the register N. The data representing a kind of the voice outputted is preset in the digit N10. Specifically, in the repeat registration mode, "1" is preset in the digit N10 by the voice selecting switch at the input section 12 when audibly pronouncing the number of the same commodities sold, while "0" is preset in the digit by the voice selection switch of the input section 12 when simply pronouncing the voice "REPEAT".

The ROM 52 stores the data formed by analyzing the voice from the speaker 38.

The synthesizing unit 50 is comprised of an interface section (not shown) and a D/A converter (not shown) which are provided between the CPU 48 and ROM 52. The synthesizing unit 50 reads out data from the ROM 52 based on the data outputted from the CPU 48, at the interface section. The synthesizing unit 50 performs an operation based on the data read out to form voice data.

Then, the voice data is converted into an analog voice signal by the D/A converter and the analog signal is applied to the speaker 38.

Figure 4:
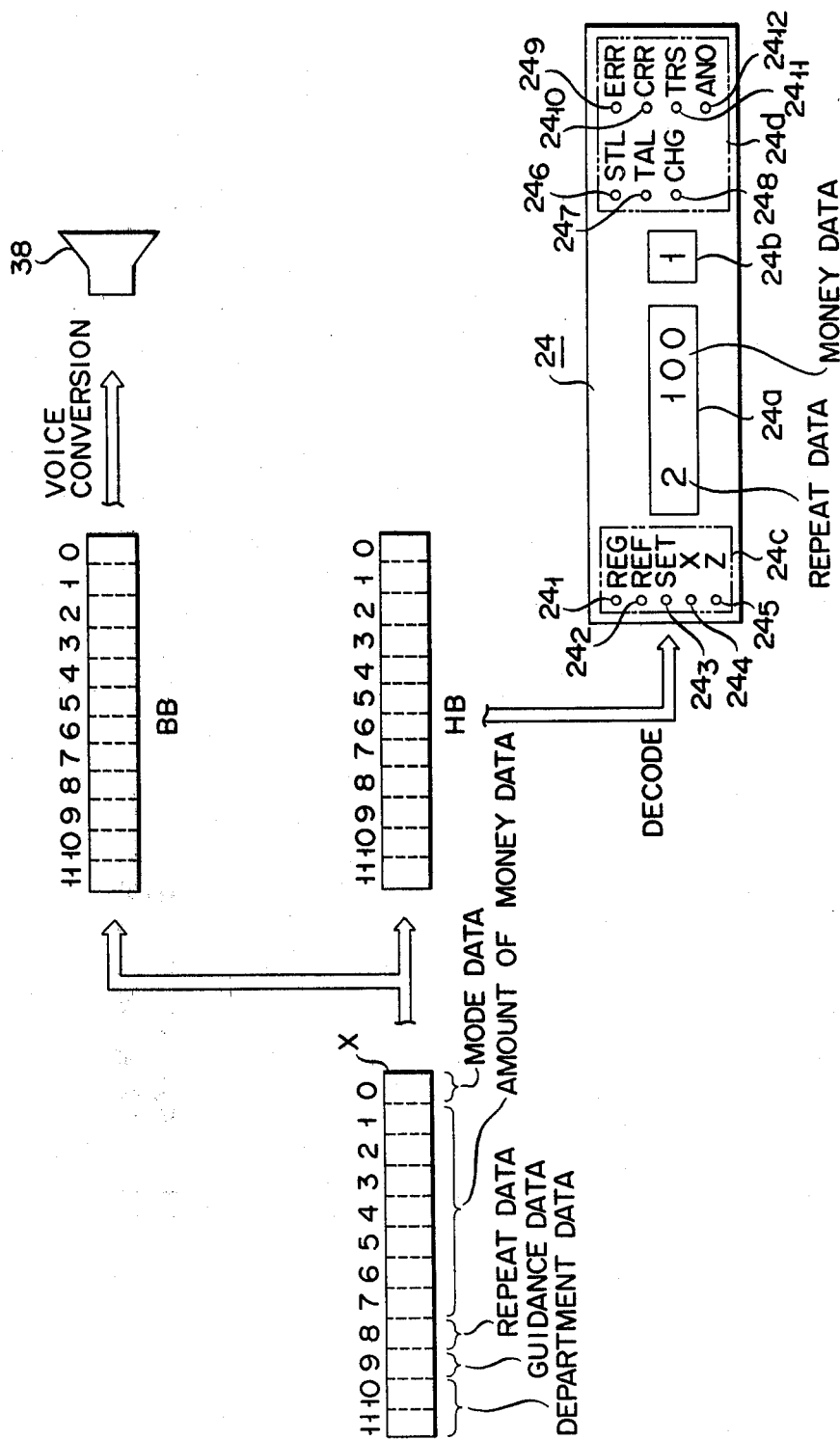
FIG. 4 is a schematic diagram for illustrating a function of each digit of a register X of a CPU shown in FIG. 1, data flows of the register X and a construction of the display section.

The operation of the embodiment as mentioned above will be described. Assume now that the voice output circuit 32 is connected to the electronic cash register of the above-mentioned embodiment. Further, let it assume that the register X of the CPU 28 has data stored as shown in FIG. 4: the mode data representing setting states of the mode switches is set in a digit X0 (a digit in the register X to which 0 is attached); the amount data are stored in the digits X1 to X7 (digits with numerals 1 to 7 attached thereto); the repeat registration data is stored in the digit X8 (a digit with a numeral "8" attached thereto); guidance data representing a kind (sub-total, total or the like) of the amount data stored is set in the digit X9 (a digit with a numeral "9" in the register X); the department data is stored in the digits X10 and X11 (digits with numerals "10" and "11" in the register X). The display section 24 is comprised of an amount display section 24a for displaying the amount data and the data indicating the number of times of repeat registration by means of light emitting diodes (LED), a department display section 24b for displaying the department data by the LEDs, a mode display section 24c with LEDs $24_1$ to $24_5$ provided at each head of indications "REG", "REF", "SET", "X" and "Z", which correspond to mode switches in the input section 12, and a guidance display section 24d with LEDs $24_6$ to $24_{12}$ provided at each head of indications, "SUB-TOTAL (STL)", "TOTAL (TAL)", "CHANGE (CHG)", "ERROR (ERR)", "CORRECTION (CRR)", "TRANSFER (TRS)" and "ARTICLE NUMBER (ANO)", which correspond to the sub-total key, the total key, and the like in the input section 12.

Under this condition, the data stored in the register X of the CPU 28 is transmitted to the display buffer HB of the display control section 26 during the display operation of the CPU 28. At this time, the chip signal CS3 transmitted from the CPU 28 to the display control section 26 is also transmitted to the voice control section 34. Therefore, the data in the register X is loaded into the voice buffer BB, too.

The data applied to the display buffer HB is decoded in the display control section 26 and then is displayed in the display section 24, as shown in FIG. 4. Specifically, the amount data and the data indicating the number of times of repeat registration are displayed at the amount display section 24a of the display section 24; the department data at the department section 24b; the mode data at the mode display section 24b; the guidance data at the guidance display section 24d. Each data is displayed with the lighting of the LEDs.

The data loaded into the voice buffer BB is converted into the voice data by the voice conversion section 36 and is transmitted to the speaker 38, so that the speaker produces a voice of the data.

Figure 5:
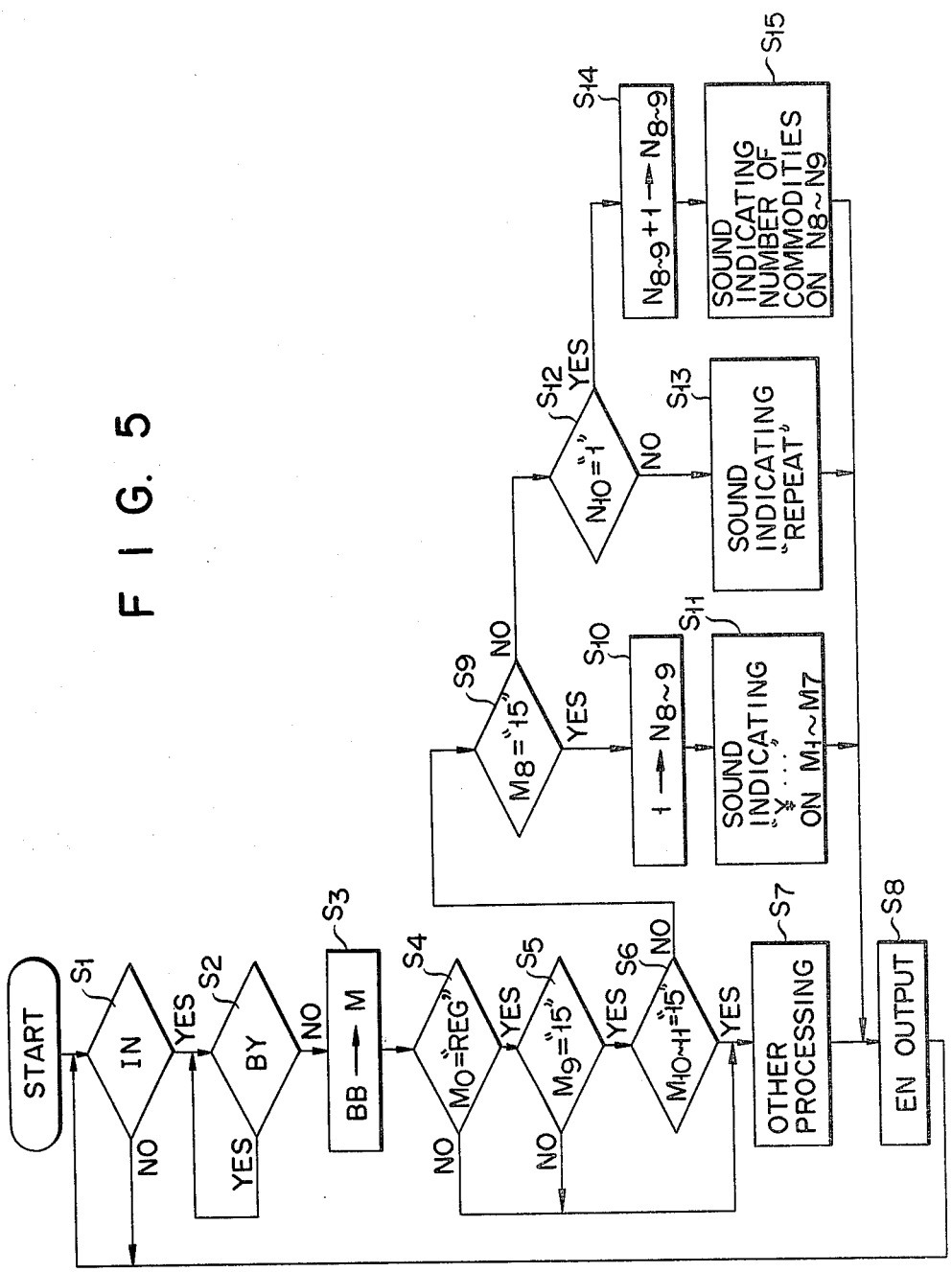
FIG. 5 is a flow chart illustrating steps for executing a voice output operation of the same embodiment.

The conversion section 36 of the voice output circuit 32 executes a voice output operation in accordance with a flow chart shown in FIG. 5.

A first step S1 judges whether or not the input signal IN is outputted from the voice control section 34. When no input signal is present, the CPU waits until the input signal IN is present. When the input signal appears, the next step S2 is executed.

In the step S2, it is judged whether or not the now writing signal BY is outputted from the voice control section 34. When the signal BY is present, this step continues until the data write operation to the voice buffer BB is completed. When the signal BY is judged to be absent, the program execution shifts to a step S3.

In the step S3, the CPU 48 transfers the chip designating signal CS' to the multiplexer 44 to switch an input state of the multiplexer 44. Afterwards, the data stored in the voice buffer BB is written into the register M of the CPU 48. Then, the program execution shifts to a step S4.

In the step S4, it is judged whether or not the data stored in the digit M0 of the register M is the "REG" mode. When it is the "REG" mode, a step S5 is executed.

In the step S5, it is judged whether or not the data in the digit M9 of the register M is a blanking code "15", that is to say, if the guidance data is stored in the digit M9 or not. In the case of the blanking code, a step S6 is executed.

In the step S6, it is judged whether or not the data stored in the digits M10 and M11 in the register M are the blanking code "15" or not, that is to say, if the department data is stored in the digits M10 and M11 or not. In the case of the blanking code "15", a step S7 is executed.

When the data stored in the digit M0 is not the "REG" mode in the step S4, and when the data stored in the digit M9 is not the blanking code "15" in the step S5, the step S7 is executed. In the step S7, the other processing is executed in accordance with the data of the digit M0. Then, a step S8 is executed.

In the step S8, the end signal EN is outputted from the CPU 48 and resets the flip-flop 42 in the voice control section 34 thereby to stop the outputting of the input signal IN. Then, the program execution returns to the step S1.

In the step S6, when the department data is stored in the digits M10 and M11, that is to say, when the blanking code "15" is not stored, a step S9 is executed.

In the step S9, it is judged whether or not the blanking code "15" is stored in the digit M8 of the register M, that is to say, whether it is the repeat registration or not. When the judgment is that the data in the digit M8 is the blanking code "15", the next step S10 is executed.

In the step S10, a numeral "1" representing that an article of commodities is registered, is written into the digits N8 and N9 of the register N. Then a step S11 is executed.

In the step S11, the amount data stored in the digits M1 to M7 in the register M are read out and is converted into voice data by the synthesizing unit 50, and the voice data is transmitted to the speaker 38. Then, the speaker 38 produces a voice " ¥ ". Then, the step S8 is executed.

In the step S9, when the data in the digit M8 of the register M is not the blanking code "15", that is, when it is the repeat registration, the next step S12 is executed.

In the step S12, it is judged whether or not the digit N10 of the register N is "1". When the data of the digit N10 is "0", that is, when it outputs the voice "REPEAT", a step S13 is executed.

In the step S13, the synthesizing unit 50 transmits the voice data of the "REPEAT" to the speaker 38. Then, the speaker 38 outputs the voice "REPEAT". Then, the step S8 is executed.

In the step S12, when the data of the digit N10 is "1", that is, when the number of commodities sold in the repeat registration is spoken, a step S14 is performed.

In the step S14, the operation of (the contents of the digits N8 and N9 of the register N) +1 is performed and the result is loaded into the digits N8 and N9 again. Through this process, the number of times of repeat registration by the present repeat registration is obtained by adding 1 to the number of times of the previous registration. Then, the program execution shifts to step S15.

In the step S15, the number of times of the repeat registration stored in the digits N8 and N9 of the register N is converted into voice data by the synthesizing unit 50, which is transferred to the speaker 38. In this way, the speaker 38 speaks the number of the commodities sold corresponding to the number of times of repeat registration. Then, step S8 is executed.

When keys in the input section 12 of the embodiment with the voice conversion section 36 as mentioned above are operated, the display and the voice output are performed in the following manner.

After the mode switch of the input section 12 is set to the "REG" mode, the amount key is operated 1, 0 and 0 and then the department key 1 is operated, the amount data "100" is displayed at the amount display section 24a of the display section 24 and the department data "1" is displayed at the department display section 24b. At the same time, the LED of the "REG" of the mode display section 24c lights. Along with these operations of display, the steps S1 to S6, and S9 to S11 are sequentially executed. The result is that the speaker 38 speaks "ONE HUNDRED YEN" representing the amount of money.

Figure 6A:
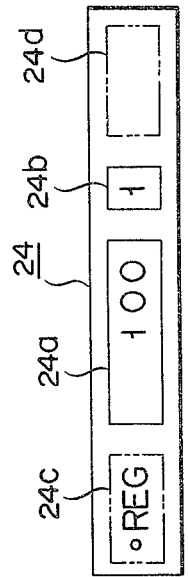
FIGS. 6A to 6C illustrate actual key operations in the embodiment, displays caused by the key operations and the contents of voices produced from a voice output circuit corresponding to the displays.
Figure 6B:
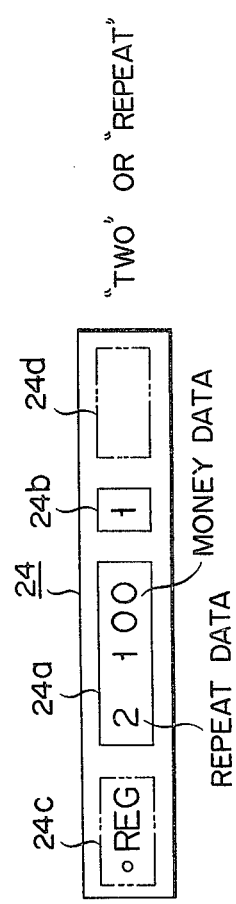

Then, when only the department key 1 is operated without operating the amount key, the repeat registration is executed. As a result, the LED of "REG" in the mode display section 24c of the display section 24 is energized, and "100" is displayed at the amount display section 24a, and "1" at the department display section 24b, as shown in FIG. 6A. The number "2" of sold commodities by the repeat registration is displayed as shown in FIG. 6B. Simultaneously with the display operations, the steps S1 to S6, S9, S12 and S13, or the steps S1 to S6, S9, S14 and S15 sequentially are executed. As a result, the speaker speaks "TWO" or "REPEAT" representing the number of sold commodities by repeat registration.

Figure 6C:
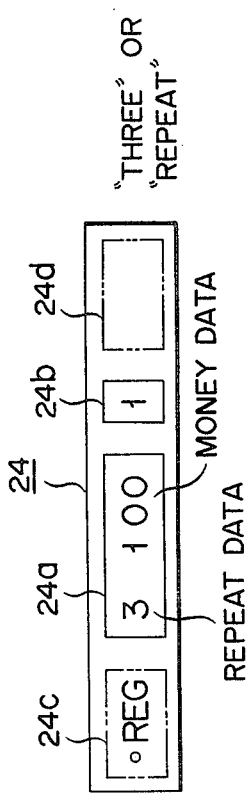

Then, only the department key 1 is again actuated without operating the amount key. At this time, the number "3" of the sold commodities by the repeat registration is displayed at the amount display section 24a, in addition to the display shown in FIG. 6A, as shown in FIG. 6C. Simultaneously with these display operations, the steps S1 to S6, S9, S12 and S13 or the steps S1 to S6, S9, S14 and S15 are sequentially executed. The result is the speaker audibly pronounces "THREE" or "REPEAT" representative of the number of commodities sold by the repeat registration.

Although the present invention is applied to the electronic cash register in the above-mentioned embodiment, it is not limited to the embodiment. The present invention could be applied to electronic devices with a repeat add/subtraction function, for example, an electronic small-scaled computer.

In the above-mentioned embodiment, the voice output circuit 32 is removably connected to the address bus line AB, the data bus line DB, and the like. The present invention is not limited to this connection manner and the voice output circuit 32, of course, may be fixedly connected to the bus lines AB, DB, and the like.

The above embodiment sounds "REPEAT", "TWO", "THREE", and the like. It is evident that the "REPEAT" may be replaced by a sound of ditto, for example, "THE SAME". In the above embodiment, the articulate sound of "REPEAT" or the sound representing the number of articles sold corresponding to the number of times of repeat registration, is provided. Alternatively, only the display or the print representing the same contents and be allowed without such an articulate sounding.

The "15" of the blanking code in the above embodiment may be replaced by any suitable number, for example, "13". The above-mentioned embodiment stores the "number of times of repeat registration" data in the digits N8 and N9 of the register N and the voice selection data in the digit N10. Of course, these data may be stored in other proper digits of the register N.

The number of digits of the register X of the CPU 28 is not limited to 12 digits as used in the above embodiment but may be set to any number of digits, as required. In this case, however, the circuit arrangement is changed in accordance with the number of digits used.

The unit of the amount data may be any suitable unit, for example, $, in addition to the ¥.

The present invention may be variously modified or changed without departing from the spirit of the invention.

What is claimed is:

1. A voice data output apparatus for an electronic cash register comprising:

input means including at least one numerical key for entering numerical data and a department key for registering the numerical data last entered by said numerical key;

control means connected to said input means which performs a registering operation based on the numerical data in accordance with the operation of said department key, said control means being arranged to perform a registering operation based on previously entered numerical data when an input signal is initially provided by the department key without first entering numerical data, and to provide a repeat signal for displaying the same data as the immediately previously entered numerical data;

visual data output means connected to said control means for producing visual data corresponding to the output of said control means; and voice output means connected to said control means which produces a voice corresponding to said numerical data delivered from said control means wherein when said control means provides said repeat signal, said voice output means is inhibited from producing said voice corresponding to said numerical data.

2. A voice data output apparatus according to claim 1, wherein said visual data output means includes printing means connected to said control means for printing said numerical data delivered from said control means, and display means connected to said control means for displaying said numerical data and the number of repeat signals delivered from said control means.

3. A voice data output apparatus according to claim 2, wherein said control means is connected to said input means, said printing means, and said voice output means through an address bus line, a data bus line and a read/write signal line; said control means also is connected to said input means through a first chip designating signal line, and to said printing means through a second chip designating signal line and a "now printing" signal line, and to said display means and said voice output means through a third chip designating signal line, for transferring data to and from said input means, said printing means and said display means.

4. A voice data output apparatus according to claim 1, wherein said voice output means includes voice control means connected to said control means with a voice buffer for storing said numerical data and said number of repeat signals delivered from said control means, voice conversion means connected to said voice control means for converting one of said numerical data and said number of repeat signals into voice data, and a speaker for producing an articulate sound in accordance with said voice data.

5. A voice data output apparatus according to claim 4, wherein said voice conversion means includes a central processing unit connected to said voice control means through a bus line, which unit includes at least a first register for storing said numerical data from said voice control means and a second register for storing said number of repeat signals and which judges whether the numerical data is to be sounded or not by said speaker in accordance with the contents of said second register; a synthesizing unit connected to said unit for forming voice data on the basis of data delivered from said unit; and a read only memory connected to said synthesizing unit which stores a previously analyzed voice and delivers voice data corresponding to the data of said synthesizing unit.

* * * * *

UNITED STATES PATENT AND TRADEMARK OFFICE
CERTIFICATE OF CORRECTION

PATENT NO. : 4,424,566
DATED : January 3, 1984
INVENTOR(S) : Hanzo TSUZUKI

It is certified that error appears in the above-identified patent and that said Letters Patent is hereby corrected as shown below:

COLUMN 1, line 19, after "commodities" change "articles" to
--article--;

COLUMN 4, line 33, change "INT" to --INL--;

COLUMN 8, line 9, after "contents" change "and be" to
--can be--.

Signed and Sealed this

Nineteenth Day of June 1984

[SEAL]

Attest:

Attesting Officer

GERALD J. MOSSINGHOFF

Commissioner of Patents and Trademarks